United States Patent [19]
Young

[11] Patent Number: 5,154,547
[45] Date of Patent: Oct. 13, 1992

[54] AUTOMATIC FISHFOOD DISPENSER

[76] Inventor: Richard Young, P.O. Box 82-144, Taipei, Taiwan

[21] Appl. No.: 846,282

[22] Filed: Mar. 2, 1992

[51] Int. Cl.$^5$ .............................................. A01K 61/02
[52] U.S. Cl. .............................. 119/51.04; 119/51.11; 222/650; 222/196
[58] Field of Search ............... 222/196, 643, 650, 333; 119/51.04, 51.11, 56.1, 56.2

[56] References Cited

U.S. PATENT DOCUMENTS

| | | | |
|---|---|---|---|
| 2,798,643 | 7/1957 | Arnett et al. | 222/196 |
| 3,370,758 | 2/1968 | Bodine | 222/196 |
| 3,435,994 | 4/1969 | Freed et al. | 222/196 |
| 3,563,523 | 2/1971 | Wendt, Jr. | 222/196 X |
| 4,095,705 | 6/1978 | Hood | 222/196 X |
| 4,949,674 | 8/1990 | Young | 222/650 X |

Primary Examiner—Kevin P. Shaver
Attorney, Agent, or Firm—Alfred Lei

[57] ABSTRACT

An automatic fishfood dispenser includes a container having a flexible base, a dispensing mechanism, and a battery pack. The base has a channel through which the outflow of fishfood is communicated to an outlet in the dispensing mechanism. A grooved rod is disposed in the channel for feeding the food from the container to the outlet. The rod has a semi-cylindrical member or eccentric mounted at one end thereof which causes the base to vibrate when the grooved rod is rotated by a battery operated motor at its other end. The base also includes a cavity in which a vibration motor is located which rotates an eccentric to vibrate the base. A quantity of fishfood to be dispensed and a time interval is preset by a user for the automatic dispensing of a quantity of fishfood at predetermined time intervals.

1 Claim, 3 Drawing Sheets

AUTOMATIC FISHFOOD DISPENSER

BACKGROUND OF THE INVENTION

This invention relates to a fishfood dispenser, and more particularly, a fishfood dispenser which automatically dispenses a predetermined quantity of fishfood at set time intervals.

Fish are common household pets which require regular feeding. However, unlike cats and dogs, fish have no means for indicating to an owner that feeding time has arrived. Furthermore because when subject to overfeeding they die, fish require a well regulated feeding schedule. Therefore, a fishfood dispenser should automatically dispense a predetermined quantity of food at set time intervals.

SUMMARY OF THE INVENTION

This invention relates to an automatic fishfood dispenser.

It is the primary object of the present invention to provide an automatic fishfood dispenser which is designed for apportioning a predetermined quantity of fishfood.

It is another object of the present invention to provide an automatic fishfood dispenser which may apportion fishfood at set time intervals.

It is still another object of the present invention to provide an automatic fishfood dispenser which may ensure the fishfood to be fed smoothly.

It is still another object of the present invention to provide an automatic fishfood dispenser which may prevent the fishfood from being damped.

It is a further object of the present invention to provide an automatic fishfood dispenser which is simple in construction.

Other objects and merits and a fuller understanding of the invention will be obtained by those having ordinary skill in the art when the following detailed description is read in conjunction with the accompanying drawings.

DETAILED DESCRIPTION OF THE PREFERRED EMBODIMENT

Figure 1:
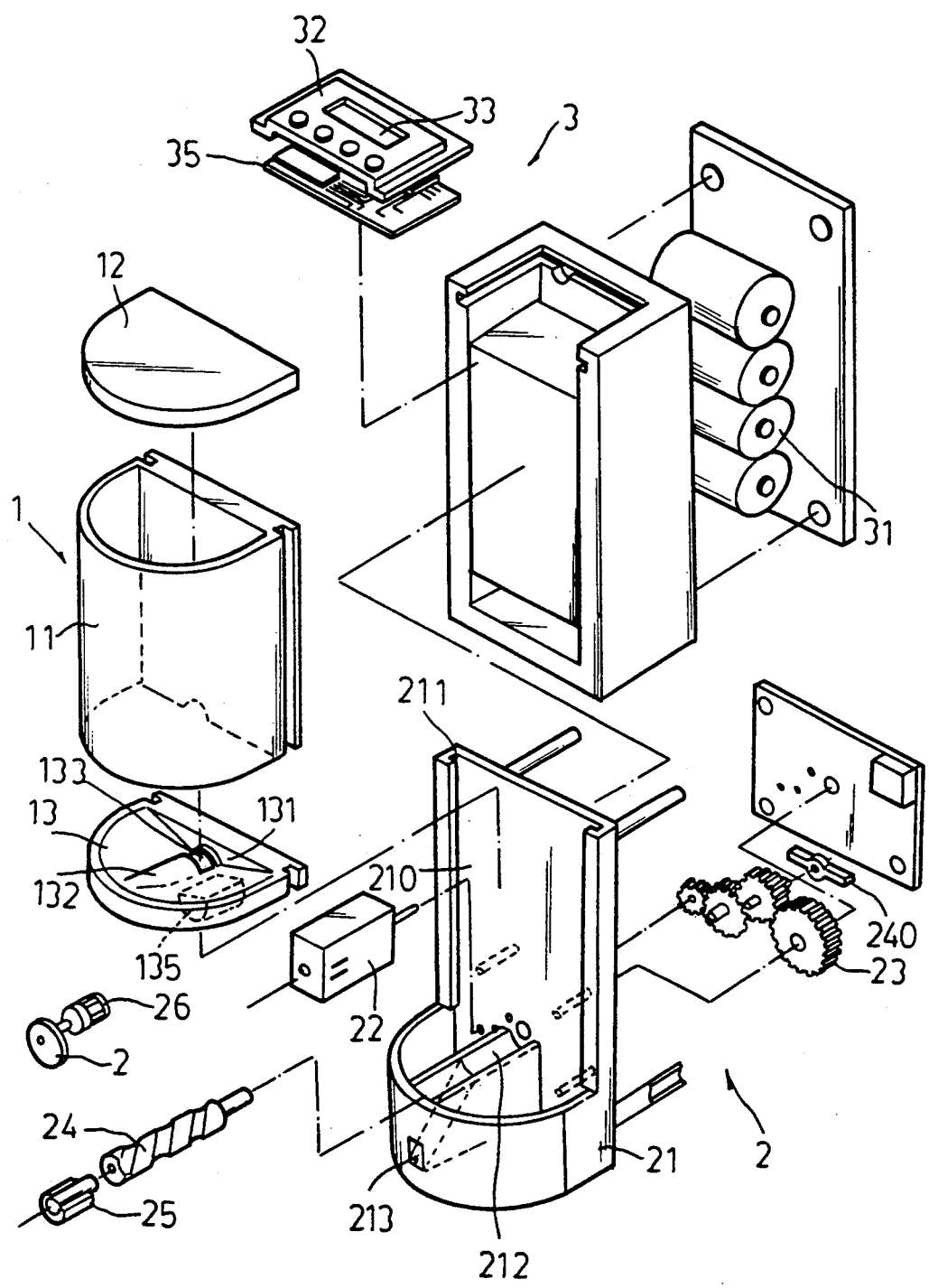
FIG. 1 is an exploded view of the present invention.

With reference to the drawings and in particular to FIG. 1 thereof, the automatic fishfood dispenser according to the present invention mainly comprises a food container 1, a dispensing mechanism 2, and a timer regulated battery power supply 3.

Figure 2:
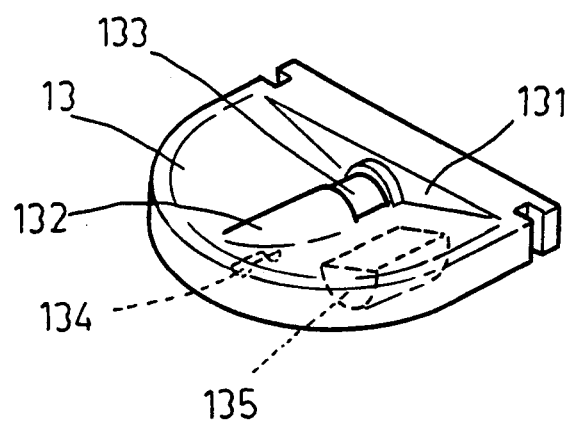
FIG. 2 is a perspective view of the base.
Figure 3:
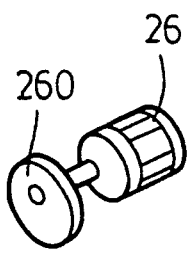
FIG. 3 is an exploded view of the vibration mechanism.
Figure 3:
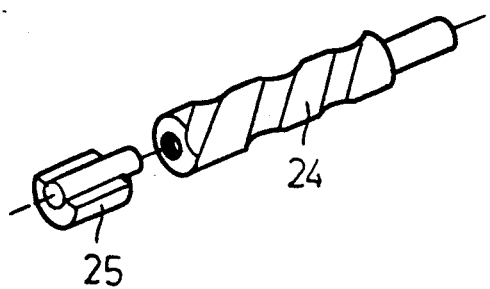
Figure 4:
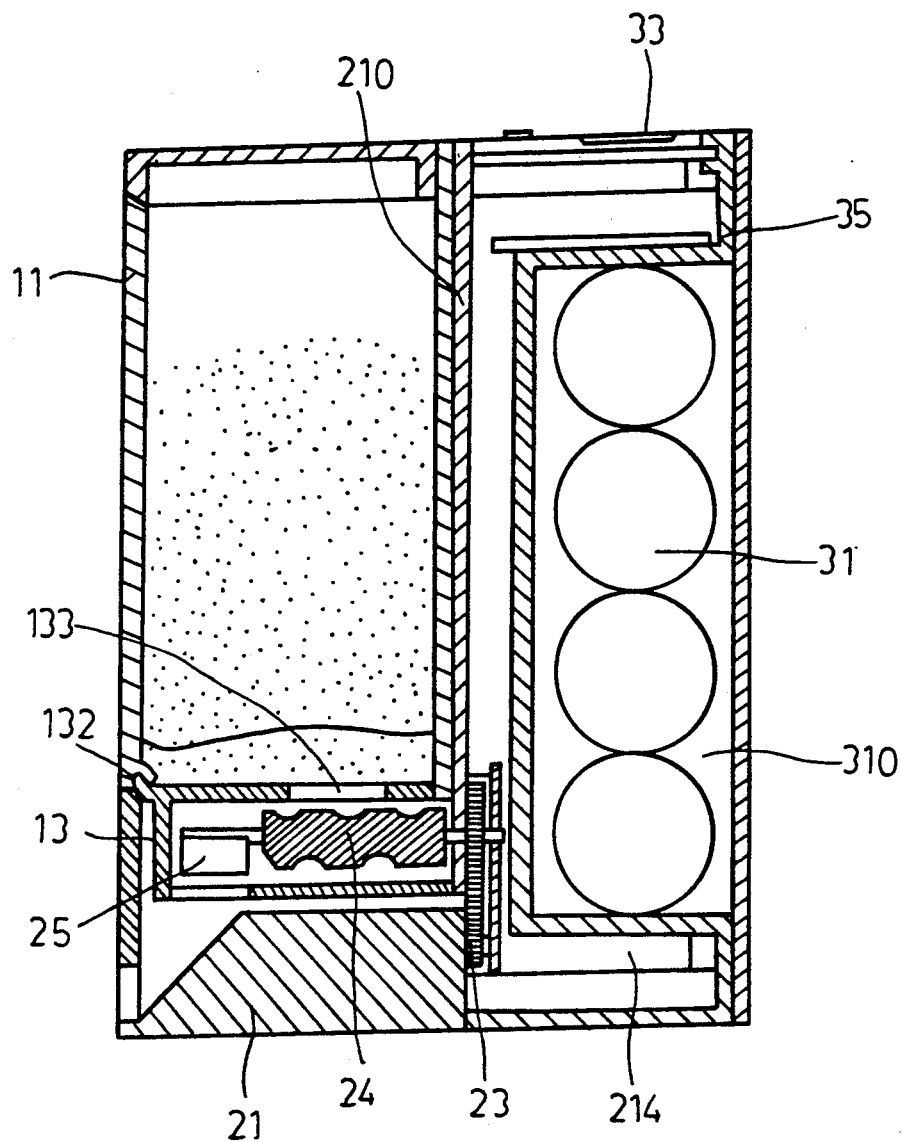
FIG. 4 is a sectional view of the present invention.

The food container 1 is provided in the form of a semi-cylindrical container 11 with a cover 12 for keeping the food therein from being contaminated. Further, the food container 1 has a base 13 mounted on the bottom thereof. The base 13 is integrally made of flexible material and provided with a recess 131 having a channel 132. An inlet 133 is formed on the channel 132 while an outlet 134 is provided on the lower side of the channel 132. A chamber 135 is formed beside the channel 132 for receiving a vibration motor 26 (see FIGS. 1 and 2). The vibration motor 26 is provided with an eccentric member 260 such that, when turned on, the vibration motor 26 will make the base 13 vibrate. The dispensing mechanism 2 is provided for regulating the outlet of fishfood and is thus shaped to mate with the food container 11. The dispensing mechanism 2 therefore includes a seat 21, provided in the same semi-cylindrical shape as the food container 11. The seat 21 is integrally formed with a straight back 210 which is provided on each side thereof with slotted grooves 211 for accepting the food container 11. Thus, the food container 11 slidably connects with the back 210 of the seat 21 by means of the grooves 211 such that the food container 1 is fixably seated on the seat 21. The seat 21 is provided on a lower portion thereof with an egress 213 for allowing an outflow of fishfood of the fish tank. An outflow of fishfood from the food container 11 via an outlet 134 through the channel 132 is communicated to the egress 213 by means of a chute 212. The chute 212 is provided in the seat 21 and corresponds with the channel 132 such that fish food dispensed by the food container 11 through the channel 132 exits the dispenser through the egress 213 via the chute 212. A rod 24 is provided in the channel 132 for regulating an outflow of fishfood from the food container 11, is threaded with a plurality of grooves. The grooved rod 24 is connected with a semi-cylindrical member or escentric 25 at one end and a trigger 240 at the other. The grooved rod 24 is rotated by means of a battery powered motor 22 operating in conjunction with a set of gears 23. The battery powered motor 22 is also disposed in the seat 21 beside the chute 212, while the gears 23 are disposed on the outer face of the back 210 directly behind the grooved rod 24. The motor 22 is powered by four batteries 31 housed in the battery pack which is attached to the outer face of the back 210 of the dispensing mechanism 2 providing a compact and efficient as well as aesthetically pleasing design. The motor 22 is user operated by a timer 3 above the batteries 31. The timer 3 includes a panel 32 on which there is a LED display 33 which operates in conjunction with a circuit board 35 to control operation of the motor 22.

A user inputs to the timer 3 a set time interval for the dispensing of fishfood and a quantity of food to be dispensed. The timer 3 then translates this information to the batteries which at particular time intervals power the motors 22 and 26 by utilizing circuitry of well-known design. Thereafter, the motor 22 rotates the grooved rod 24 to allow a predetermined quantity of fishfood to be dispensed to the fishtank and motor 26 rotates the eccentric 260. At the same time as the grooved rod 24 is rotated, the semi-cylindrical member 25 and the eccentric member 260 will vibrate the base 13 thereby preventing the outlet 134 from being blocked. Further, as the present invention stops, the semi-cylindrical member 25 will assume a downward position and completely close the outlet 134 thus preventing the fishfood from being dumped.

Although the present invention has been described with a certain degree of particularly, it is understood that the present disclosure is made by way of example only and that numerous changes in the detail of construction and the combination and arrangement of parts may be resorted to without departing from the spirit and scope of the invention as hereinafter claimed.

I claim:
1. An automatic fishfood dispenser comprising:
a food container having a removable cover;

a flexible base mounted on a bottom of said food container and formed with a recess having a channel and a chamber, said channel being provided with an inlet an inlet and an outlet, said chamber being formed beside said channel for receiving a vibration motor, said vibration motor being provided with an eccentric member so that when turned on, said vibration motor will make said base vibrate;

a dispensing mechanism provided with a seat on which said food container is disposed, said seat integrally formed with a straight back provided with slotted grooves on each side thereof by means of which said seat being provided on a lower portion thereof with an egress for allowing an outflow of fishfood to a fishtank, an outflow of fishfood from said food container through said channel communicated to said egress via a chute an grooved rod positioned in said channel for regulating an outflow of fishfood to said chute, said grooved rod being connected with a semi-cylindrical member at one end and a trigger at the other and rotated by a battery powered motor, said semi-cylindrical member, when stationary, blocking an outflow of fishfood through said channel to said chute, also disposed in said seat, operating in conjunction with a set of gears which are disposed on an exterior surface of said seat; and a battery pack housing a plurality of batteries for operating said battery powered motor and said vibration motor, further comprising a timer by means of which a user communicates a set quantity of fishfood to be dispensed by said automatic fishfood dispenser through a rotation of said grooved rod and a set time interval at which said battery operated motor activates said grooved rod.

* * * * *